US012719097B2

(12) United States Patent
Na et al.

(10) Patent No.: US 12,719,097 B2
(45) Date of Patent: Aug. 25, 2026

(54) METHOD FOR CHARGING AND DISCHARGING BATTERY

(71) Applicants: SK On Co., Ltd., Seoul (KR); HANA TECHNOLOGY CO., LTD., Gyeonggi-do (KR)

(72) Inventors: Ji Won Na, Daejeon (KR); Sung Yeop Kim, Daejeon (KR); Eun Soo Cho, Daejeon (KR)

(73) Assignees: SK On Co., Ltd., Seoul (KR); HANA TECHNOLOGY CO., LTD., Gyeonggi-do (KR)

(*) Notice: Subject to any disclaimer, the term of this patent is extended or adjusted under 35 U.S.C. 154(b) by 909 days.

(21) Appl. No.: 17/844,445

(22) Filed: Jun. 20, 2022

(65) Prior Publication Data

US 2023/0018424 A1 Jan. 19, 2023

(30) Foreign Application Priority Data

Jul. 14, 2021 (KR) ........................ 10-2021-0091952

(51) Int. Cl.
*H01M 10/44* (2006.01)
*H01M 10/0525* (2010.01)
(Continued)

(52) U.S. Cl.
CPC ..... *H01M 10/446* (2013.01); *H01M 10/0525* (2013.01); *H01M 10/058* (2013.01); *H01M 50/609* (2021.01)

(58) Field of Classification Search
CPC ........... H01M 10/0525; H01M 10/058; H01M 50/609
(Continued)

(56) References Cited

U.S. PATENT DOCUMENTS 5,481,174 A 1/1996 Martin et al.
6,377,030 B1 * 4/2002 Asao .................. H01M 10/052 320/161
(Continued)

FOREIGN PATENT DOCUMENTS

DE 0981194 B1 * 7/2011 ................ H02J 7/00
EP 0598470 B1 7/1999
(Continued)

OTHER PUBLICATIONS

Radu Gogoana, Internal Resistance Variances in Lithium-Ion Batteries and Implications in Manufacturing, XP055057927, Jun. 28, 2012, Massachusetts Institute of Technology.
(Continued)

*Primary Examiner* — Julian D Huffman
*Assistant Examiner* — Ryu-Sung P. Weinmann
(74) *Attorney, Agent, or Firm* — IP&T GROUP LLP

(57) ABSTRACT

A method for charging and discharging a battery, includes, operations of: manufacturing a battery by coupling a battery case and battery electrodes and injecting an electrolyte into the battery case; and activating a battery by inputting a current pulse having a predetermined period to the battery electrodes, wherein the period includes a first time and a second time, equal to or less than the first time, wherein the battery is charged by the current pulse during any one of the first time and the second time, and the battery is discharged by the current pulse during the other one of the first time the second time.

11 Claims, 8 Drawing Sheets

(51) Int. Cl.
*H01M 10/058* (2010.01)
*H01M 50/609* (2021.01)

(58) Field of Classification Search
USPC .......................................................... 320/132
See application file for complete search history.

(56) References Cited

U.S. PATENT DOCUMENTS

| | | | | |
|---|---|---|---|---|
| 2009/0309553 | A1* | 12/2009 | Marinka-Toth | H02J 7/927 320/155 |
| 2014/0327406 | A1 | 11/2014 | Hempel | |
| 2015/0010783 | A1 | 1/2015 | He et al. | |
| 2017/0054184 | A1* | 2/2017 | Tanabe | H01M 10/44 |
| 2021/0194264 | A1 | 6/2021 | Hale | |

FOREIGN PATENT DOCUMENTS

| | | | | |
|---|---|---|---|---|
| EP | 0981194 | B1 * | 7/2011 | H02J 7/00711 |
| JP | 2004236381 | A | 8/2004 | |
| KR | 10-2013-0134055 | A | 12/2013 | |
| KR | 20150071499 | A | 6/2015 | |
| KR | 10-2020-0095490 | A | 8/2020 | |

OTHER PUBLICATIONS

Extended European Search Report for European Patent Application No. 22180553.4 issued by the European Patent Office on Jul. 4, 2024.

International Search Report for the PCT Application No. PCT/KR2023/007098 by the Korean Intellectual Property Office on Sep. 18, 2023.

* cited by examiner

METHOD FOR CHARGING AND DISCHARGING BATTERY

CROSS-REFERENCE TO RELATED APPLICATION(S)

This application claims the benefit under 35 USC 119(a) of Korean Patent Application No. 10-2021-0091952 filed on Jul. 14, 2021 in the Korean Intellectual Property Office, the entire disclosure of which is incorporated herein by reference for all purposes.

BACKGROUND

The present disclosure relates to a method for charging and discharging a battery.

An activation process during a battery manufacturing process refers to a process for activating a battery by repeating a charging and discharging processes several times so that an initial battery, assembled during a battery production process, may store electrical energy. Charging and discharging in the process for activating a battery may be performed in a manner using a current or voltage. A magnitude of the current may be increased in the charging process and the discharging process using the current in order to shorten a time required for the activation process, but in this case, there may be a problem in which a quality of the battery is deteriorated due to lithium plating, or the like, in which lithium is deposited on a surface of the negative electrode.

SUMMARY

An aspect of the present disclosure is to provide a method for charging and discharging a battery capable of effectively preventing deterioration of battery quality while shortening a time required for a battery activation process.

According to an aspect of the present disclosure, a method for charging and discharging a battery includes operations of: manufacturing a battery by coupling a battery case and battery electrodes and injecting an electrolyte into the battery case; and activating a battery by inputting a current pulse having a predetermined period to the battery electrodes, wherein the period includes a first time and a second time, less than or equal to the first time, wherein the battery is charged by the current pulse during any one of the first time and the second time, and the battery is discharged by the current pulse during the other one of the first time and the second time.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
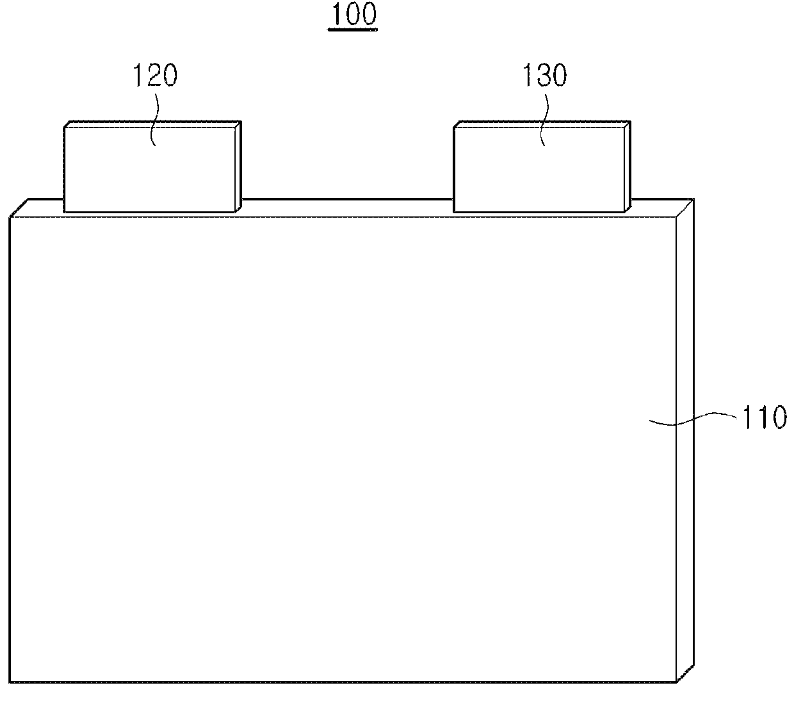
FIG. 1 is a diagram simply illustrating a battery according to an embodiment of the present disclosure.

The details of other embodiments are included in the detailed description and drawings.

Advantages and features of the present disclosure and methods of achieving the same will become apparent with reference to the embodiments described below in detail in conjunction with the accompanying drawings. However, the present disclosure is not limited to the embodiments disclosed below, and may be implemented in various different forms, and only the present embodiments allow the present disclosure to be complete, and are provided to completely inform those skilled in the art to which the present disclosure pertains to, and the present disclosure is only defined by the scope of the claims. Like reference numerals refer to like elements throughout the specification.

FIG. 1 is a diagram simply illustrating a battery according to an embodiment of the present disclosure.

Referring to FIG. 1, a battery 100 according to an embodiment of the present disclosure may include a battery case 110, battery electrodes 120 and 130, and the like. The battery electrodes 120 and 130 may provide positive electrode 120 and a negative electrode 130 of the battery, respectively, and may be respectively connected to a positive electrode plate and a negative electrode plate accommodated in the battery case 110. An electrolyte may be filled in the battery case 110, and a separator may be inserted between the positive and negative electrode plates.

When the battery case 110 and the battery electrodes 120 and 130 are coupled, and an electrolyte is filled in the battery case 110, an activation process in which the battery 100 is charged and discharged a plurality of times by applying a current and/or a voltage thereto through the battery electrodes 120 and 130 may be undertaken. In a charging process of the activation process, lithium ions of the positive electrode 120 may move to the negative electrode 130 through the electrolyte and the separator, while in a discharging process, lithium ions stored in the negative electrode 130 may move to the positive electrode 120 oppositely thereto. The positive electrode 120 may include a material capable of providing lithium ions, for example, lithium oxide.

In other words, the charging process of the activation process may be a process of moving lithium ions of the positive electrode 120 to the negative electrode 130, and the charging process may be undertaken using a current flowing opposite to the discharging process. During the activation process, the charging process and the discharging process may be undertaken in a charging-discharging system including a DC/DC converter capable of charging and discharging the battery 100, a charging and discharging controller, and power conversion devices.

For example, the power conversion device may convert AC power into DC power. The DC power converted by the power converter may be supplied to the battery 100 through the DC-DC converter, and an operation of the DC-DC converter may be controlled by a charging-discharging controller connected thereto. According to embodiments, the charging-discharging system may include a plurality of power conversion devices and a plurality of DC-DC converters, and a plurality of charging-discharging controllers to simultaneously charge a plurality of batteries 100. The plurality of charging-discharging controllers may be controlled by one management device.

In order to shorten a time required for the activation process, a magnitude of the current input to the battery electrodes 120 and 130 may be increased. However, a phenomenon of lithium plating in which, as the magnitude of the current is increased, lithium ions are excessively concentrated into the negative electrode 130, so that lithium ions cannot be inserted into the negative electrode 130 and are deposited on a surface of the negative electrode 130, may occur, and lithium plating may lead to a decrease in the charging capacity of the battery 100. In addition, the quality of the battery 100 may be deteriorated due to an increase in DCIR in addition to lithium plating.

In an embodiment of the present disclosure, a battery charging-discharging method capable of reducing the time required for the activation process and minimizing deterioration of the battery 100 due to lithium plating and DCIR increases, is proposed. According to an embodiment of the present disclosure, the battery 100 may be charged and/or discharged using a current pulse, rather than a constant current, and a current may not be input to the battery 100 during the charging process and/or the discharging process by the current pulse, or conversely, there may be a time at which the battery 100 is discharged in the charging process or the battery 100 is charged during the discharging process. Accordingly, it is possible to prevent lithium plating from occurring due to excessive movement of lithium ions to the negative electrode 130, and an increase in DCIR may be minimized.

The battery 100 according to the embodiment shown in FIG. 1 may have a unidirectional cell structure. However, the battery charging-discharging method according to an embodiment of the present disclosure may be applied to a battery having a structure, different from the unidirectional cell structure, for example, a bidirectional cell structure, a bidirectional multi-tap structure, and the like.

Figure 2:
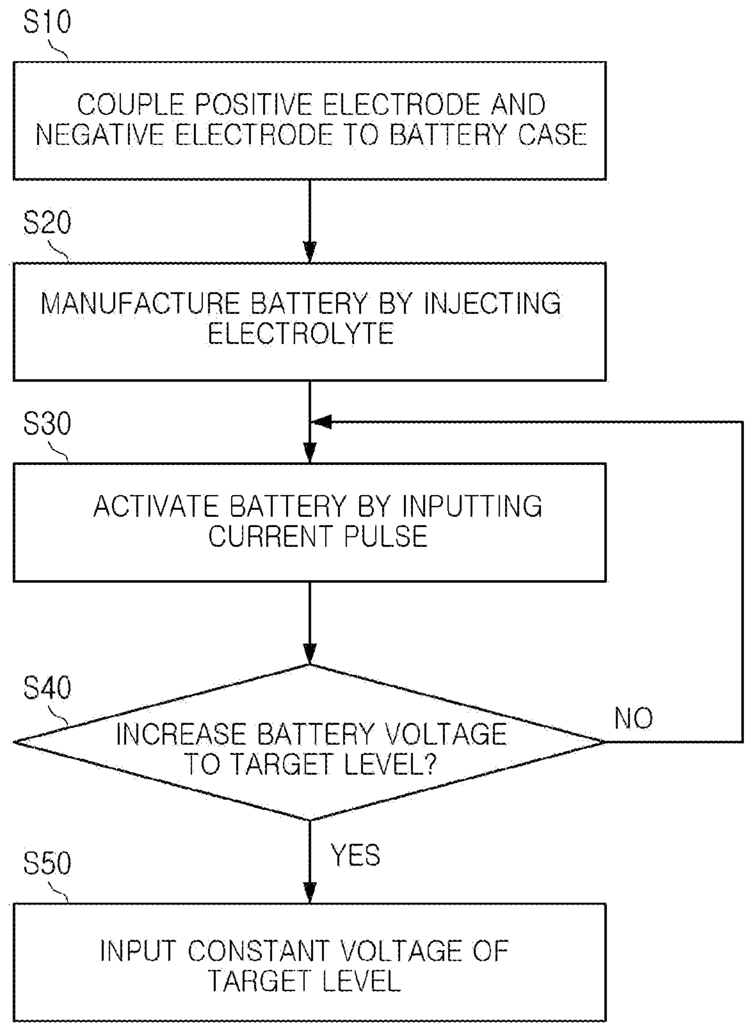
FIG. 2 is a flowchart illustrating a method for charging and discharging a battery according to an embodiment of the present disclosure.

FIG. 2 is a flowchart for illustrating a method for charging and discharging a battery according to an embodiment of the present disclosure.

Referring to FIG. 2, the method for charging and discharging a battery according to an embodiment of the present disclosure may start with manufacturing a battery by coupling a battery case and battery electrodes (S10). As described above, the battery electrodes may include a positive electrode and a negative electrode, and the positive electrode may be connected to a positive electrode plate inside the battery case, and the negative electrode may be connected to a negative electrode plate inside the battery case. According to embodiments, a plurality of positive electrode plates and a plurality of negative electrode plates may be disposed inside the battery case, and a separator may be inserted between the positive and negative electrode plates. The separator can prevent the positive and negative electrode plates from coming into direct contact with each other.

When the battery electrodes and the battery case are coupled, an electrolyte may be filled in the battery case (S20). The electrolyte is a medium for smooth movement of lithium ions in the battery case. For example, when a current and/or voltage for charging is input, lithium ions released from the positive electrode plate pass through the separator through the electrolyte to move to the negative electrode plate.

Next, an activation process may be undertaken by inputting a current pulse to the battery electrodes of the assembled battery (S30). The activation process may include an operation of charging and discharging the battery multiple times as described above. In other words, the activation process may include a plurality of charging operations and a plurality of discharging operations.

In the charging operation, a current may be applied to the positive electrode. In other words, electrons may be applied to the negative electrode, whereby lithium ions may be separated from the positive electrode and be moved from an inside of the battery to the negative electrode through the electrolyte and may be stored in the negative electrode. Conversely, in the discharging operation, a current can flow from the negative electrode to the positive electrode along conductors connected to the battery. Therefore, the lithium ions stored in the negative electrode may be separated and move from the inside of the battery to the positive electrode.

In the activation process, it may be determined whether a voltage of the battery increases to a target level by inputting a current pulse to the battery (S40). As a result of the determination in operation S40, if it is determined that the voltage of the battery has not increased to the target level, the charging operation and the discharging operation using the current pulse may be repeated. On the other hand, if it is determined that the voltage of the battery has increased to the target level as a result of the determination in operation S40, the activation process may be continued by applying a constant voltage rather than a current pulse to the battery electrodes (550). However, in some embodiments, the activation process using a constant voltage may be omitted.

FIGS. 3A to 3D are diagrams illustrating a waveform of a current pulse applied to a battery in a method for charging and discharging a battery according to an embodiment of the present disclosure.

For example, FIGS. 3A to 3D may be diagrams illustrating currents input to electrodes of a battery for a charging operation of the battery during an activation process. First, referring to FIG. 3A, in the battery charging-discharging method according to an embodiment of the present disclosure, a current pulse 200 may be input to battery electrodes. The current pulse 200 may be a square wave current having a predetermined period TP1, unlike a constant current $I_{CC}$. However, the shape of the current pulse 200 may be variously modified according to embodiments.

In order to substantially match a charge amount and discharge amount of the battery in a charging operation and a discharging operation using the current pulse 200 with a charge amount and a discharge amount of the battery in the charging operation and the discharging operation using the constant current $I_{CC}$, a maximum charging current $I_{CH1}$ of the current pulse 200 and a duty ratio thereof may be determined. For example, in the embodiment shown in FIG. 3A, the maximum charging current $I_{CH1}$ of the current pulse 200 may be twice that of the constant current $I_{CC}$. Therefore, by setting the duty ratio of the current pulse 200 to 50%, the charge amount and discharge amount in the charging operation and the discharging operation using the current pulse 200 may substantially match the charge amount and discharge amount in the charging operation and the discharging operation using the constant current $I_{CC}$.

Figure 3A:
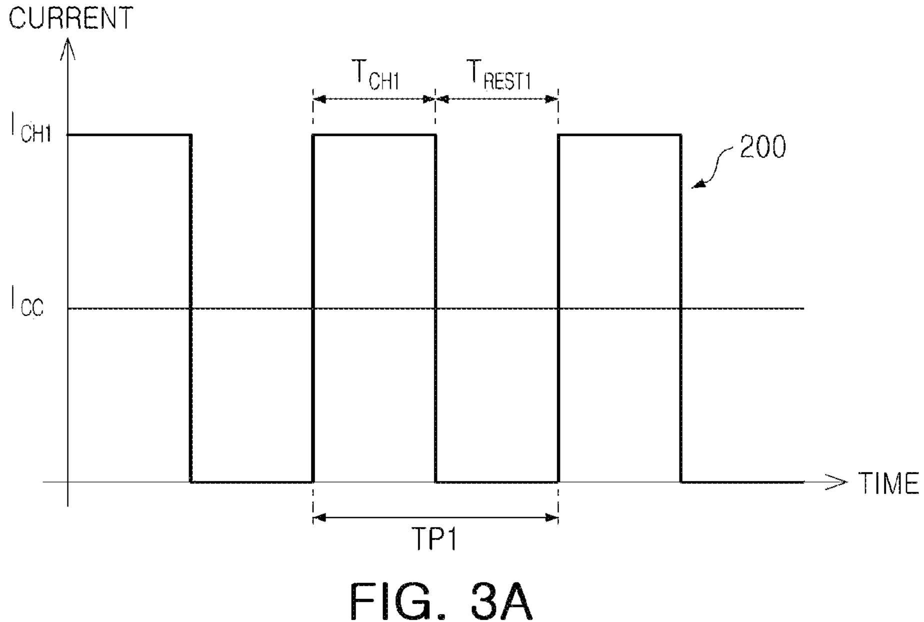
FIGS. 3A to 3D are diagrams illustrating waveforms of a current pulse applied to a method for charging and discharging a battery according to an embodiment of the present disclosure.

In other words, in the embodiment shown in FIG. 3A, the first time TCH1 for charging the battery and the second time TREST1 for stopping the charging of the battery within one period TP1 may be the same. In addition, the maximum charging current $I_{CH1}$ may be twice the constant current $I_{CC}$. Accordingly, the battery may be charged at the same speed as compared to the case of charging the battery using the constant current $I_{CC}$. However, compared to the case of charging the battery with a constant current $I_{CC}$, since there is a second time $T_{REST1}$ in which no charging current is input to the battery during the charging operation, it is possible to prevent lithium plating, in which lithium ions are excessively moved to the negative electrode of the battery and lithium ions are deposited on a surface of the negative electrode.

According to embodiments, the maximum charging current $I_{CH1}$ may be set to a value greater than twice the constant current $I_{CC}$. In this case, a C-Rate in the charging operation of charging the battery using the current pulse 200 may be greater than a C-Rate in the charging operation of charging the battery using the constant current $I_{CC}$, and as a result, a time required for the charging operation of the battery may be shortened, and the activation process of the battery may be undertaken faster.

For example, assuming that the maximum charging current is set to three times the constant current $I_{CC}$, and the first time $T_{CH1}$ at which the battery is charged and the second time $T_{REST1}$ at which the battery is stopped are equal, that is, the duty ratio of the current pulse 200 is set to 50%, the C-Rate in the above example may be about 1.5 times the C-Rate in the case of charging the battery with a constant current $I_{CC}$. Accordingly, it is possible to shorten the time required for charging the battery to the same capacity and reduce the time required for the activation process of the battery.

Figure 3B:
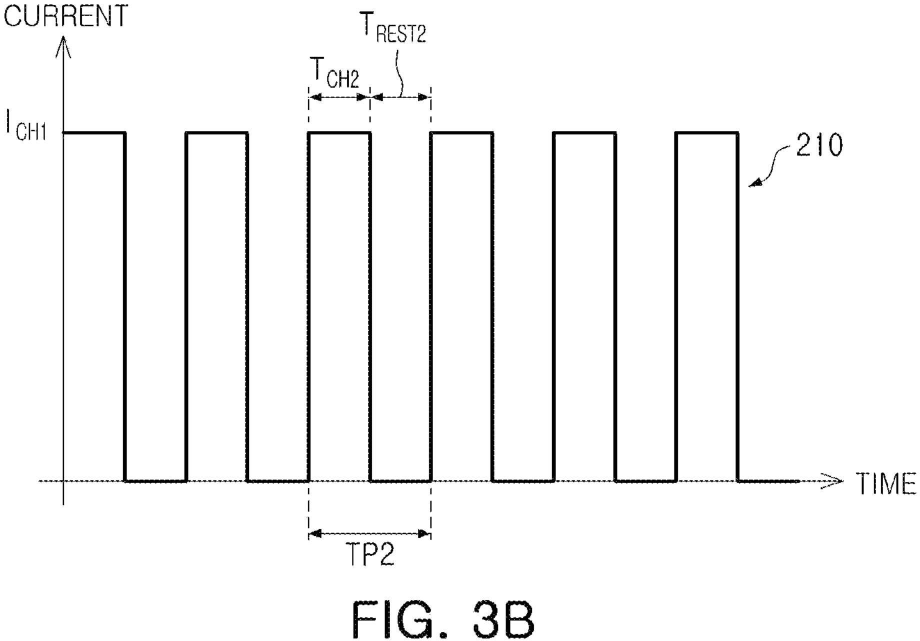

Next, referring to FIG. 3B, the current pulse 210 may have the same maximum charging current $I_{CH1}$ and duty ratio as in the embodiment described above with reference to FIG. 3A. In other words, in the embodiment shown in FIG. 3B, a duty ratio of the current pulse 210 input to the battery electrodes for the charging operation during the activation process may be 50%, and the first time $T_{CH2}$ and the second time $T_{REST2}$ may be equal to each other.

However, in the embodiment shown in FIG. 3B, a period TP2 of the current pulse 210 may be different from that in the embodiment shown in FIG. 3A. For example, in the embodiment shown in FIG. 3B, the period TP2 of the current pulse 210 may be ½ times the period TP1 of the current pulse 200 in the embodiment shown in FIG. 3A. Accordingly, the current pulse 210 may have a frequency twice as high as that of the current pulse 200 according to the embodiment shown in FIG. 3A. However, since the maximum charging current $I_{CH1}$ and the duty ratio of the current pulse 210 are the same in the embodiments described with reference to FIGS. 3A and 3B, the battery charge amount thereof may also be substantially the same.

According to embodiments, a duty ratio of a current pulse 220 may be greater than 50%. For example, referring to FIG. 3C, a first time $T_{CH3}$ at which the current pulse 220 has a maximum charging current $I_{CH2}$ within a period TP1 of the current pulse 220 may be longer than a second time $T_{REST3}$ at which the current pulse 220 is not applied and the battery is not charged.

Figure 3C:
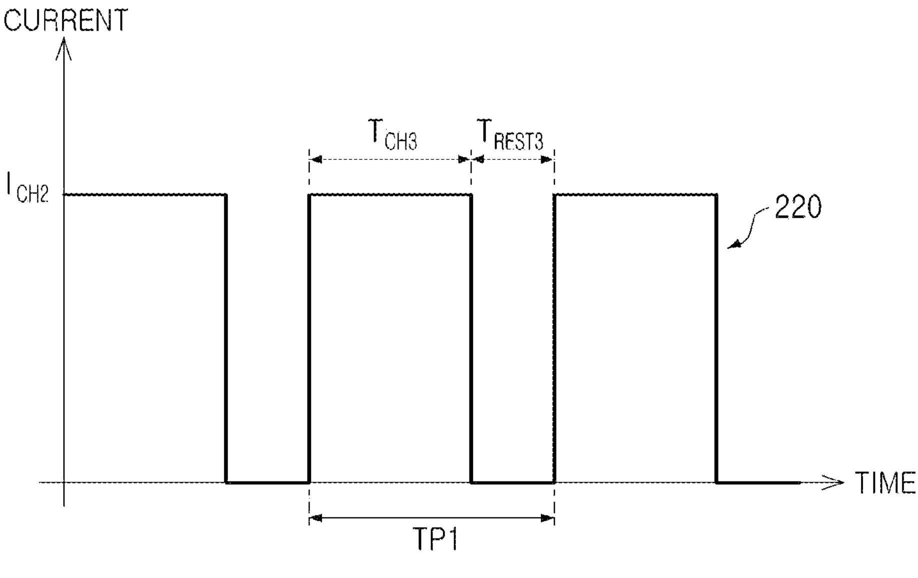

In the embodiment shown in FIG. 3C, the maximum charging current $I_{CH2}$ of the current pulse 220 may be determined by a difference between a first time $T_{CH3}$, and a second time $T_{REST3}$. For example, when the first time $T_{CH3}$ is twice the second time $T_{REST3}$, a duty ratio of the current pulse 220 may be ⅔. In this case, when the maximum charging current $I_{CH2}$ of the current pulse 220 is at a level of 75% of the maximum charging current $I_{CH1}$ in the embodiments described with reference to FIGS. 3A and 3B above, the charge amount of the battery for the same time may be equal to each other in the embodiments of FIGS. 3A to 3C.

On the other hand, if the maximum charging current $I_{CH2}$ of the current pulse 220 is greater than 75% of the maximum charging current $I_{CH1}$ in the embodiments described with reference to FIGS. 3A and 3B, the charge amount of the battery for the same time may be greater than that in the embodiments of FIGS. 3A and 3B. Conversely, if the maximum charging current $I_{CH2}$ of the current pulse 220 is less than 75% of the maximum charging current $I_{CH1}$ in the embodiments described with reference to FIGS. 3A and 3B, the charge amount of the battery for the same time may be smaller than that in the embodiments of FIGS. 3A and 3B.

Figure 3D:
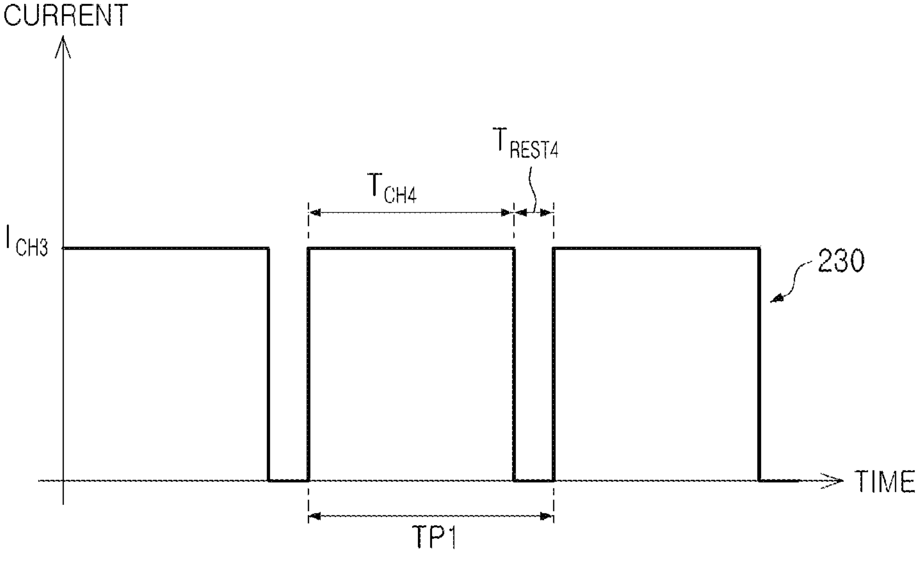

Next, in the embodiment shown in FIG. 3D, a duty ratio of the current pulse 230 may be ⅚. In other words, within one period TP1 of the current pulse 230, a length of a first time $T_{CH4}$ at which the current pulse 230 is input to the battery may be five times a length of a second time $T_{REST4}$ at which the current pulse 230 is not input to the battery.

As described above with reference to FIG. 3C, in order to set a charge amount of the battery to be the same as that of the embodiments of FIGS. 3A to 3C for the same time, a maximum charging current $I_{CH3}$ of the current pulse 230 may have to be less than maximum charging currents $I_{CH1}$ and $I_{CH2}$ in other embodiments. As an example, by reducing the maximum charging current ICH3 of the current pulse 230 to a level of 60% of the maximum charging current ICH1 in the embodiments of FIGS. 3A to 3C, the charge amount of the battery for the same time may be maintained substantially the same as in the embodiments of FIGS. 3A to 3C.

In the embodiments described with reference to FIGS. 3A to 3D, in the charging operation using the current pulses 200 to 230, a charging current for charging the battery may be input for the first times $T_{CH1}$ to $T_{CH4}$ within one period TP1 and TP2, and a charging current may not be input to the battery electrodes for the remaining second time periods $T_{REST1}$ to $T_{REST4}$. Therefore, it is possible to obtain an effect that a rest time is given to the battery for a predetermined time corresponding to the second times ($T_{REST1}$ to $T_{REST4}$), and the occurrence of lithium plating, in which lithium ions are excessively moved to the negative electrode in the battery and lithium ions are deposited on a surface of the negative electrode may be suppressed.

For example, a direction in which a charging current flows may be defined as a first direction. The charging current can flow from a negative electrode to a positive electrode, and electrons can move from the positive electrode to the negative electrode. As electrons move from the positive electrode to the negative electrode, lithium ions inside the battery may pass through the separator to move to the negative electrode, and the battery can be charged.

However, according to embodiments, the occurrence of lithium plating may be suppressed by periodically discharging the battery during the charging operation. Hereinafter, it will be described in more detail with reference to FIG. 4.

Figure 4:
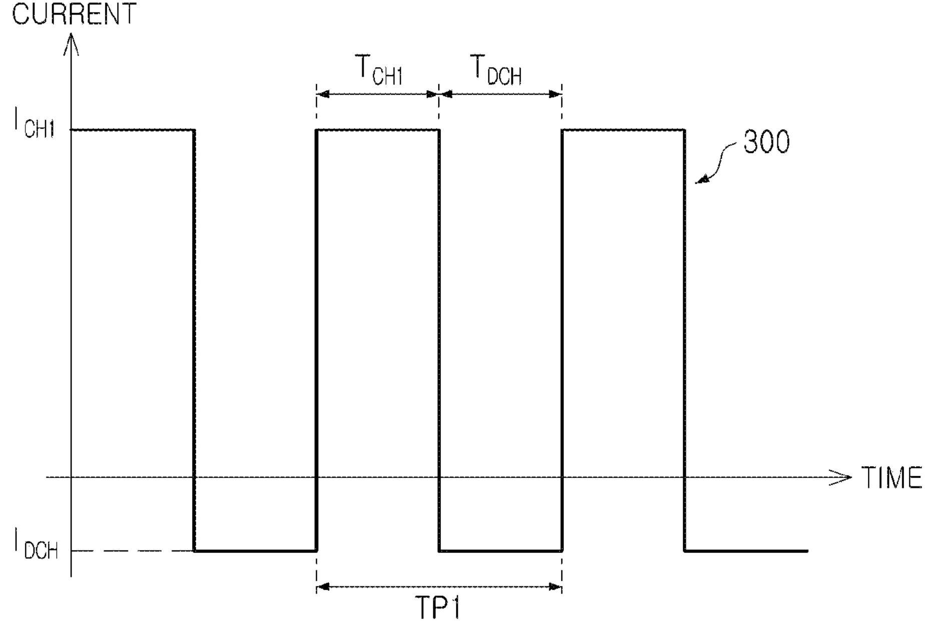
FIG. 4 is a diagram illustrating a waveform of a current pulse applied to a battery in a method for charging and discharging a battery according to an embodiment of the present disclosure.

FIG. 4 is a diagram illustrating a waveform of a current pulse applied to a battery in a battery charging-discharging method according to an embodiment of the present disclosure.

Referring to FIG. 4, in the battery charging-discharging method according to an embodiment of the present disclosure, a current pulse 300 may be input to battery electrodes. The current pulse 300 may be a current input to the battery electrodes during a charging operation. The current pulse 300 is a square wave current having a predetermined period TP1, and a maximum charging current $I_{CH1}$ may be input to the battery electrodes for a first time $T_{CH1}$ by the current pulse 300, and a discharging current $I_{DCH}$ may be input to the battery electrodes. A magnitude of the discharging current $I_{DCH}$ may be lower than a magnitude of the maximum charging current $I_{CH1}$.

In other words, in an embodiment illustrated in FIG. 4, a battery may be charged during the first time $T_{CH1}$ during the charging operation of the battery, and a battery may be discharged during the second time $T_{DCH}$. When a lithium plating phenomenon occurs in a negative electrode due to the maximum charging current $I_{CH1}$ input to the battery electrodes during the first time $T_{CH1}$, lithium ions on a surface of the negative electrode may be removed for the second time $I_{DCH}$ by the discharging current $I_{DCH}$. Therefore, it is possible to prevent deterioration of a battery life due to lithium plating, or the like, and, at the same time, increase the maximum charging current $I_{CH1}$ input to the battery during the first time $T_{CH1}$ increase a C-Rate to shorten a time required for the activation process.

Meanwhile, according to embodiments, the discharging current $I_{DCH}$ may be input to the battery electrodes only in some periods in periods of repetitively appearing current pulses. For example, in consideration of the lithium plating phenomenon appearing in the negative electrode due to the maximum charging current $I_{CH1}$, the discharging current $I_{DCH}$ may be input for the second time $T_{DCH}$ only in one period out of N times (N is a natural number greater than or equal to 2), and no current may be input to the battery electrode during the second time $T_{DCH}$ of the remaining periods. In other words, a charging operation of the battery may be undertaken with a current pulse in which the current pulse 200 according to the embodiment described with reference to FIG. 3A and the current pulse 300 according to the embodiment described with reference to FIG. 4 are coupled.

FIGS. 5A to 5D are diagrams illustrating a waveform of a current pulse applied to a battery in a battery charging-discharging method according to an embodiment of the present disclosure.

For example, FIGS. 5A to 5D may be diagrams illustrating currents input to electrodes of a battery for a discharging operation of the battery during an activation process. First, referring to FIG. 5A, in the battery charging-discharging according to an embodiment of the present disclosure, a current pulse 400 may be input to battery electrodes. Unlike a constant current $I_{DC}$, the current pulse 400 may be a square wave current having a predetermined period TP1.

When it is desired to substantially match a discharge amount of the battery in the discharging operation using the current pulse 400 with the discharge amount of the battery in the discharging operation using the constant current $I_{DC}$, the discharge amount of the battery may be controlled by a duty ratio and the maximum discharging current $I_{DCH1}$ of the current pulse 400. For example, in the embodiment illustrated in FIG. 5A, the maximum discharging current $I_{DCH1}$ of the current pulse 400 may be twice the constant current $I_{DC}$. In this case, by setting the duty ratio of the current pulse 400 as 50%, that is, by setting the first time $T_{DCH1}$ at which the battery is discharged and the second time $T_{REST1}$ at which discharging of the battery is stopped are the same within one period TP1, the discharge amount of the battery by the current pulse may substantially match the discharge amount of the battery by the constant current $I_{DC}$.

Figure 5A:
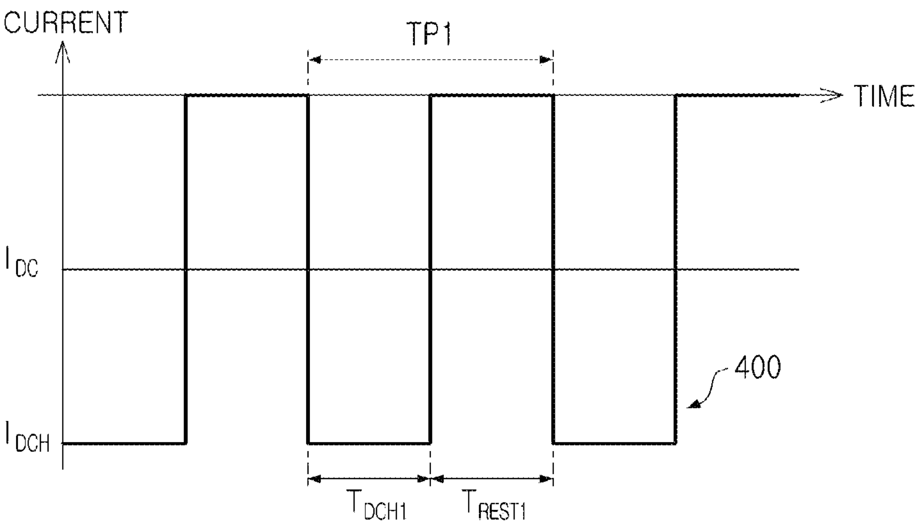
FIGS. 5A to 5D are diagrams illustrating waveforms of a current pulse applied to a battery in a method for charging and discharging a battery according to an embodiment of the present disclosure.
Figure 5B:
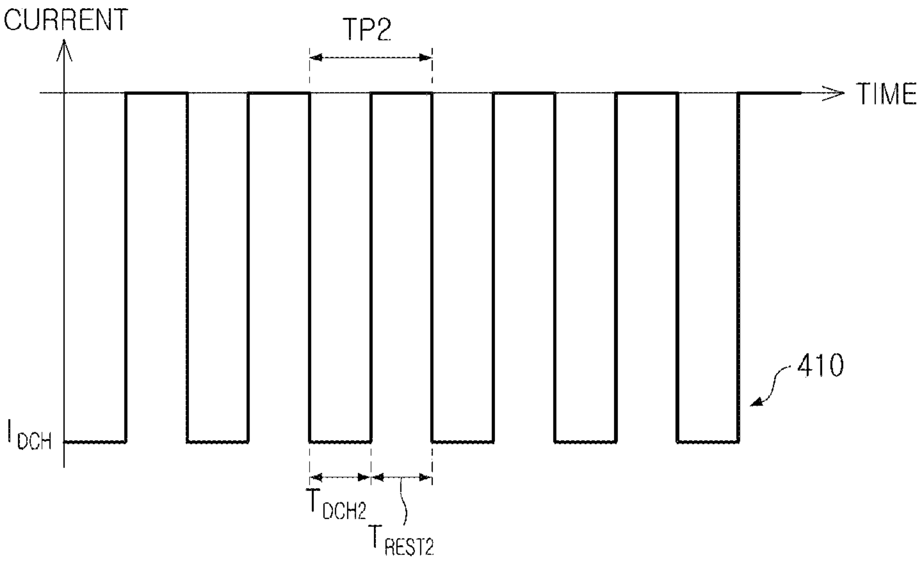

Next, referring to FIG. 5B, the current pulse 410 may have the same maximum discharging current $I_{CH1}$ and duty ratio as in the embodiment described above with reference to FIG. 5A. In other words, in the embodiment shown in FIG. 5B, the duty ratio of the current pulse 410 may be 50%, and the first time $T_{DCH2}$ and the second time $T_{REST2}$ may be equal to each other. However, in the embodiment shown in FIG. 5B, a period TP2 of the current pulse 410 may be ½ times the period TP1 in the embodiment shown in FIG. 5A.

According to embodiments, a duty ratio of a current pulse 420 may be variously modified. As an example, referring to FIG. 5C, a first time $T_{DCH3}$ at which the current pulse 420 has a maximum discharging current $I_{DCH2}$ within one period TP1 of the current pulse 420 may be longer than a second time $T_{REST3}$ at which discharging of the battery is stopped since the current pulse 420 is not applied to the battery electrodes.

Figure 5C:
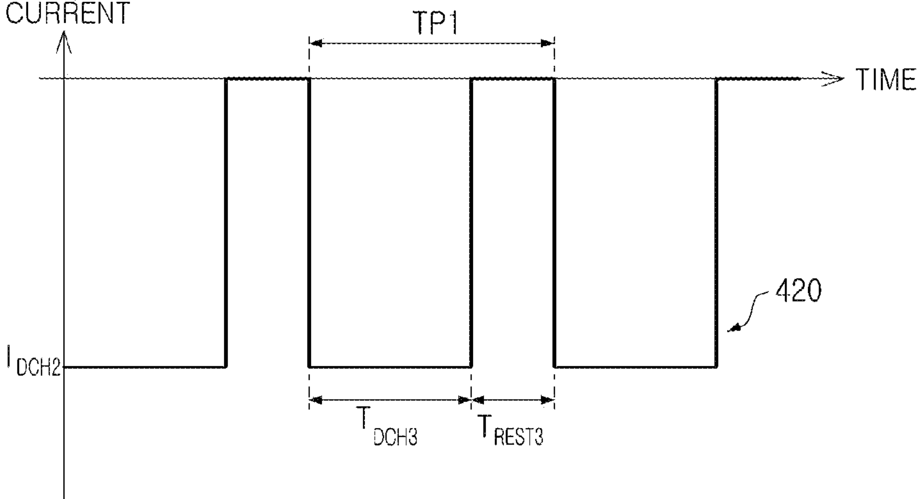

In the embodiment shown in FIG. 5C, a discharge amount of the battery may be determined by the maximum discharging current IDCH2 of the current pulse 420 and a difference between the first time $T_{DCH3}$ and the second time $T_{REST3}$. For example, when the first time $T_{DCH3}$ is twice the second time $T_{REST3}$, and the maximum discharging current $I_{CDCH2}$ is at a level of 75% of the maximum discharging current $I_{DCH1}$ in the embodiments described with reference to FIGS. 5A and 5B, the discharge amount of the battery during the same time may be the same in the embodiments in FIGS. 5A to 5C. On the other hand, when the maximum discharging current $I_{DCH2}$ of the current pulse 420 is different from 75% of the maximum charging current $I_{DCH1}$ in the embodiments described with reference to FIGS. 5A and 5B, the discharge amount of the battery is also may vary during the same time.

Figure 5D:
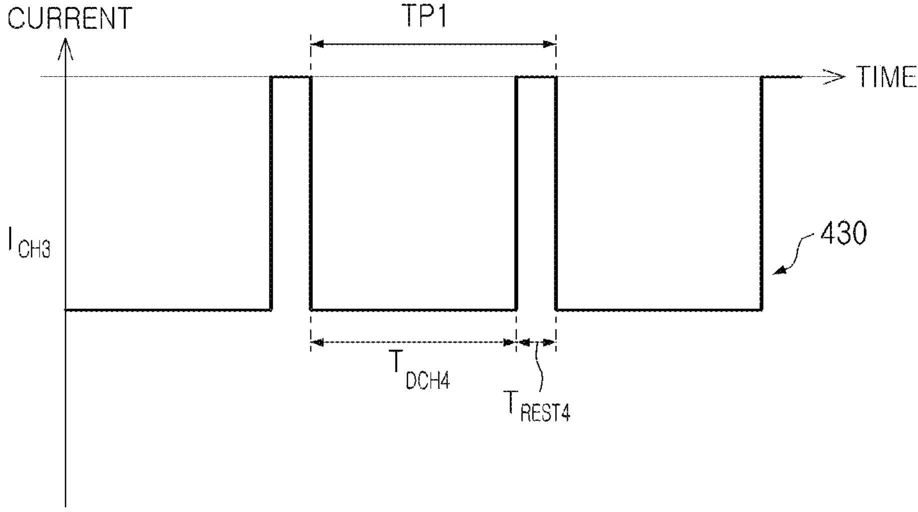

Next, in the embodiment shown in FIG. 5D, a duty ratio of the current pulse 430 may be ⅚. In other words, within one period TP1 of the current pulse 430, a length of the first time $T_{DCH4}$ in which the current pulse 430 is input to the battery may be five times a length of the second time period $T_{REST4}$ in which the current pulse 230 is not input to the battery.

As described above with reference to FIG. 5C, in order to set the discharge amount of the battery to be the same as in the embodiments of FIGS. 5A to 5C for the same time, a maximum discharging current $I_{DCH3}$ of the current pulse 430 may have to be less than maximum discharging currents $I_{DCH1}$ and $ID_{CH2}$ in other embodiments. For example, by reducing the maximum discharging current $I_{DCH3}$ of the current pulse 430 to a level of 60% of the maximum discharging current $I_{DCH1}$ in the embodiments of FIGS. 5A and 5B, the discharge amount of the battery for the same time may be maintained substantially the same as in the embodiments of FIGS. 5A to 5C.

For example, a direction in which the discharging current flows during the discharging operation may be defined as a second direction opposite to the first direction in which the above-described charging current flows. A discharging current can flow from a positive electrode to a negative electrode, and electrons can move from the negative to the positive electrode. Accordingly, lithium ions concentrated on the negative electrode of the battery during the charging operation may pass through a separator inside the battery, and move to the positive electrode during the discharging operation.

Meanwhile, unlike the embodiments described with reference to FIGS. 5A to 5D, the battery may be periodically charged while the discharging operation is in progress. Hereinafter, it will be described with reference to FIG. 6.

Figure 6:
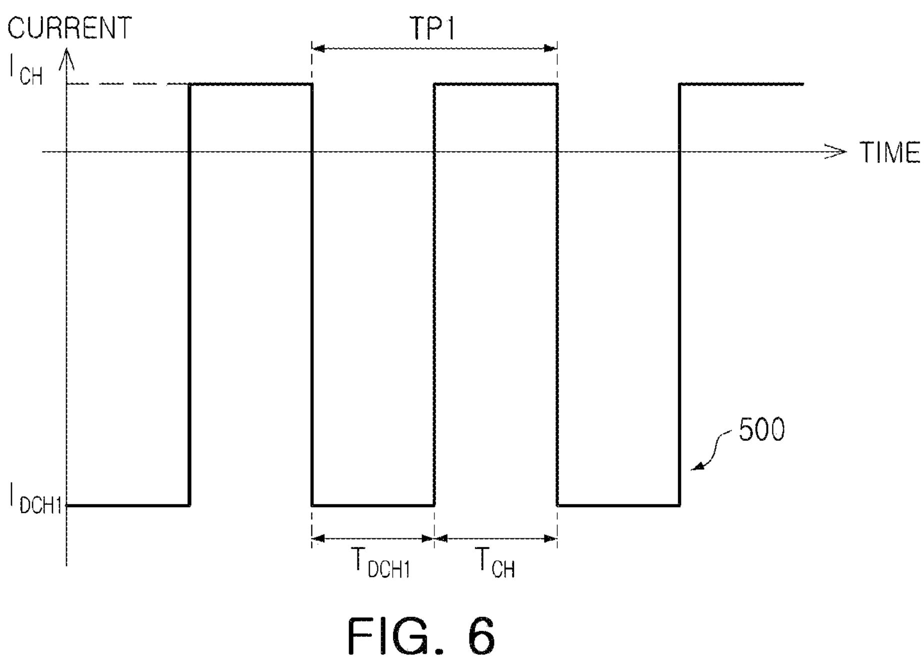
FIG. 6 is a diagram illustrating a waveform of a pulsed current applied to a battery in a method for charging and discharging a battery according to an embodiment of the present disclosure.

FIG. 6 is a diagram illustrating a waveform of a current pulse applied to a battery in a battery charging-discharging method according to an embodiment of the present disclosure.

Referring to FIG. 6, in a discharging operation of the battery charging-discharging method according to an embodiment of the present disclosure, a current pulse 500 may be input to battery electrodes. The current pulse 500 is a square wave current having a predetermined period TP1, a maximum discharging current $I_{DCH1}$ may be input to the battery electrodes during a first time $T_{DCH1}$, and a charging current $I_{CH}$ may be input to the battery electrodes during a second time $T_{CH}$. A magnitude of the charging current $I_{CH}$ may be lower than a magnitude of the maximum discharging current $I_{DCH1}$. In other words, in an embodiment illustrated in FIG. 6, a battery may be discharged during the first time $T_{DCH1}$, and a battery may be weakly charged during the second time $T_{CH}$.

Meanwhile, according to embodiments, the charging current $I_{CH}$ may be input to the battery electrodes only in some periods in periods of repetitively appearing current pulses. For example, in order not to decrease the efficiency of the discharging operation, the charging current $I_{CH}$ may be input to the battery electrode for the second time $T_{CH}$ only in one period among the N periods (N is a natural number equal to or greater than 2), and a current may not be input to the battery electrodes for the second time $T_{CH}$ of the remaining periods. In other words, a discharging operation of the battery may be undertaken with a current pulse in which the current pulse 400 according to an embodiment described with reference to FIG. 5A and the current pulse 500 according to an embodiment described with reference to FIG. 6 are coupled.

Figure 7:
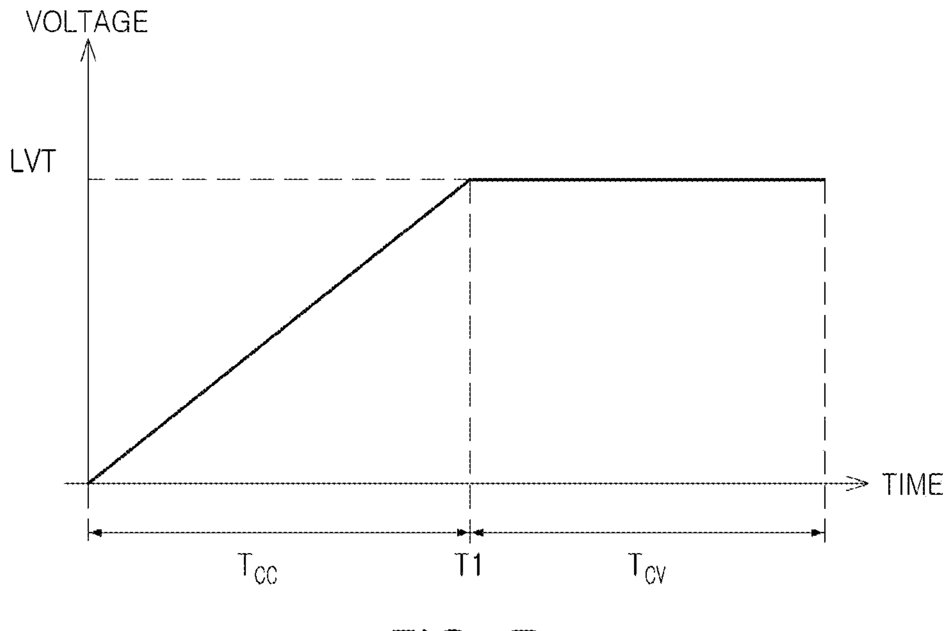
FIG. 7 is a graph for illustrating a method for charging and discharging a battery according to an embodiment of the present disclosure.

FIG. 7 is a graph for illustrating a battery charging-discharging method according to an embodiment of the present disclosure.

FIG. 7 may be a graph illustrating a change in a voltage of a battery during a charging operation of the battery. Referring to FIG. 7, a battery may be charged with a current before a fist time point T1, and the battery may be charged with a voltage after the first time point T1.

As described above, during a current charging time $T_{cc}$, a current pulse may be input to the battery, to move lithium ions from s positive electrode to a negative electrode from an inside the battery. As the current charging time ($T_{CC}$) to which the current pulse is input elapses, a difference in voltage between the positive electrode and the negative electrode of the battery may increase, and after the first time point T1, when the difference in voltage therebetween increases to a target level (LVT), it can be switched to a charging operation.

In the system for charging and discharging the battery, a constant voltage having a constant potential difference to the positive electrode and the negative electrode of the battery during a voltage charging time $T_{CV}$ after a first time point T1. In this case, a magnitude of the current pulse input to the battery after the first time point T1 may gradually decrease. When the voltage charging time $T_{CV}$ elapsed, the battery charging/discharging system may end a charging operation for the battery and start a discharging operation. By repeating each of the charging operation and the discharging operation a plurality of times in this manner, an activation process of the battery may be undertaken.

As set forth above, according to the technical idea of the present disclosure, a time for stopping charging and discharging a battery during a charging process and a discharging process may be secured, or conversely, a time for charging or discharging a battery may be secured. Accordingly, deterioration of the battery may be prevented by suppressing occurrence of lithium plating in which lithium is deposited on a surface of negative electrode, and minimizing an increase in direct current internal resistance (DCIR).

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

What is claimed is:

1. A method for charging and discharging a battery, comprising operations of:

manufacturing the battery by coupling a battery case and battery electrodes and injecting an electrolyte into the battery case; and activating the battery by inputting a current pulse having a predetermined period to the battery electrodes, wherein the predetermined period comprises a first time period and a second time period, the second time period does not overlap and is equal to or less than the first time period, wherein the battery is charged and not discharged by the current pulse during the first time period and is discharged but not charged by the current pulse during the second time period, or the battery is discharged but not charged by the current pulse during the first time period and is charged but not discharged by the current pulse during the second time period, and wherein the current pulse has a plurality of first risings and a plurality of first falls in the first time period, or the current pulse has a plurality of second risings and a plurality of second falls in the second time period.

2. The method for charging and discharging a battery of claim 1, wherein the current pulse is input to the battery electrodes in a charging operation for charging the battery and a discharging operation for discharging the battery.

3. The method for charging and discharging a battery of claim 2, wherein, in the charging operation, the current pulse charges the battery for the first time period, and discharges the battery for the second time period, and in the discharging operation, the current pulse discharges the battery for the first time period, and charges the battery for the second time period.

4. The method for charging and discharging a battery of claim 2, wherein, in the charging operation, a current flowing in a first direction is input to the battery for the first time period, and a current input to the battery is blocked for the second time period.

5. The method for charging and discharging a battery of claim 4, wherein, in the discharging operation, a current flowing in a second direction, opposite to the first direction, is input to the battery for the first time period, and a current input to the battery is blocked for the second time period.

6. The method for charging and discharging a battery of claim 2, wherein, in the charging operation, a current flowing in a first direction is input to the battery for the first time period, and a current flowing in a second direction, opposite to the first direction is input thereto for the second time period.

7. The method for charging and discharging a battery of claim 6, wherein, in the discharging operation, a current flowing in the second direction is input to the battery for the first time period, and a current flowing in the first direction is input to the battery for the second time period.

8. The method for charging and discharging a battery of claim 1, further comprising an operation of inputting a constant voltage of the target level to the battery, when a voltage of the battery increases to a predetermined target level by the current pulse.

9. The method for charging and discharging a battery of claim 1, wherein the battery is a lithium ion battery.

10. The method for charging and discharging a battery of claim 1, wherein the predetermined period of the current pulse, a duty ratio of the current pulse, and a level of the current at each of the first time period and the second time period are adjusted according to a charging rate (C-rate) of the battery.

11. The method for charging and discharging a battery of claim 1, wherein the current pulse has a plurality of first risings and a plurality of first falls in the first time period, and the current pulse has a plurality of second risings and a plurality of second falls in the second time period, and wherein timings of the plurality of first risings are different from timings of the plurality of second risings, or timings of the plurality of first falls are different from timings of the plurality of second falls.

* * * * *